J. L. MAHONEY.
MACHINE FOR FORMING PLASTIC ARTICLES BY DIPPING.
APPLICATION FILED FEB. 26, 1915.

1,160,923.

Patented Nov. 16, 1915.
7 SHEETS—SHEET 2.

WITNESSES:
H. W. Meade
E. M. Culver

INVENTOR
Jeremiah L. Mahoney
BY
A. M. Wooster
ATTORNEY

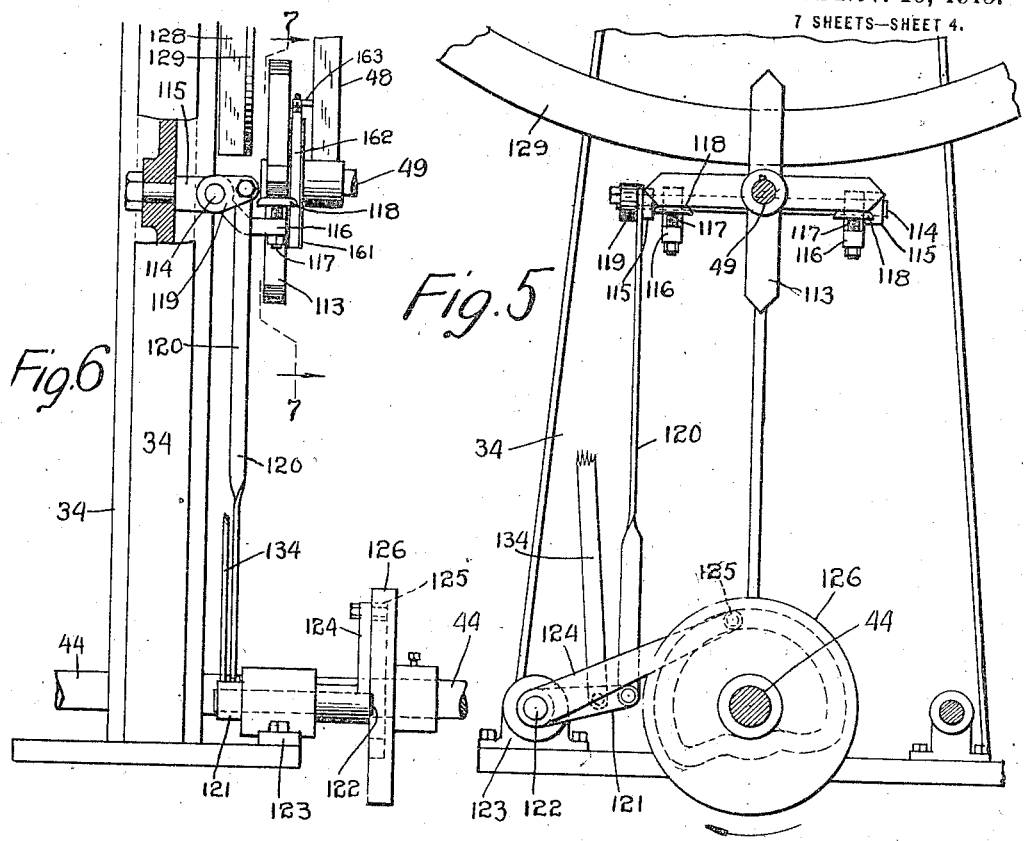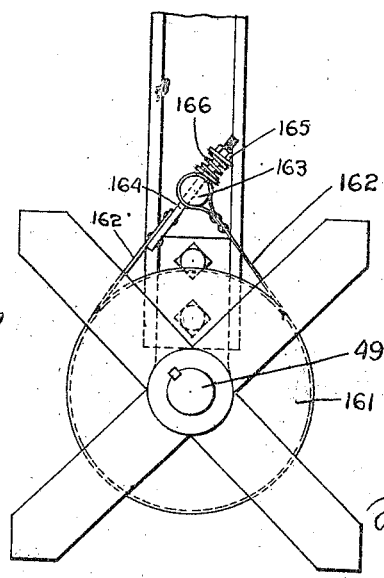

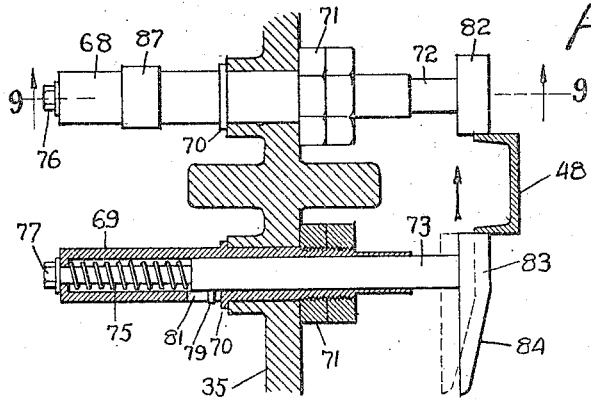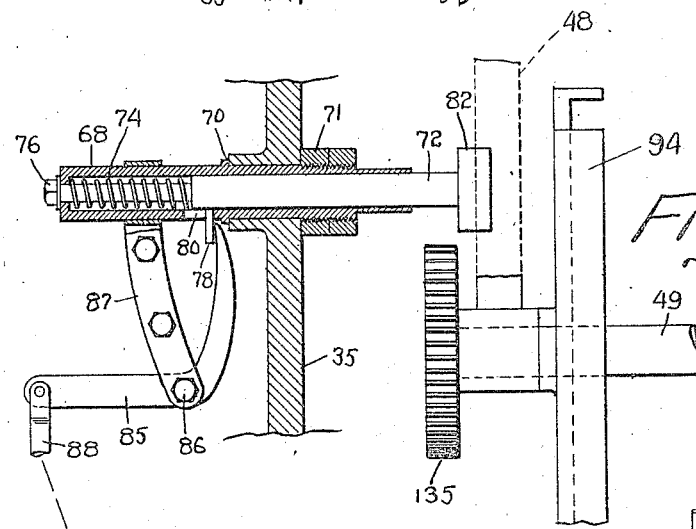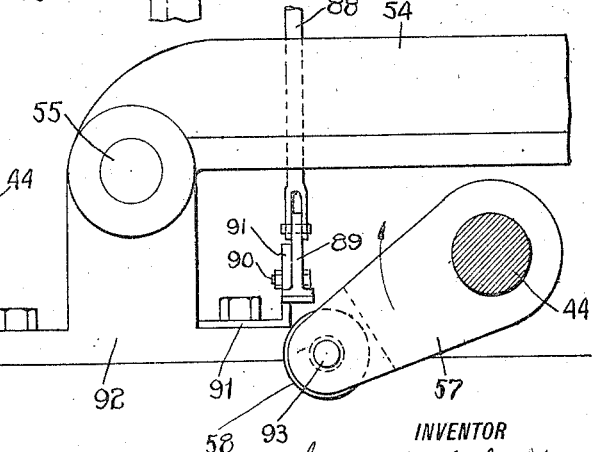

J. L. MAHONEY.
MACHINE FOR FORMING PLASTIC ARTICLES BY DIPPING.
APPLICATION FILED FEB. 26, 1915.
1,160,923.
Patented Nov. 16, 1915.
7 SHEETS—SHEET 6.
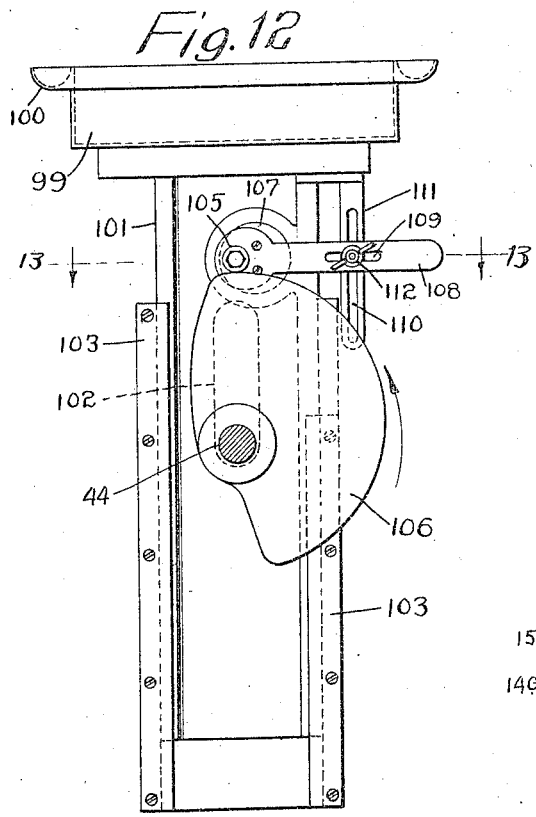
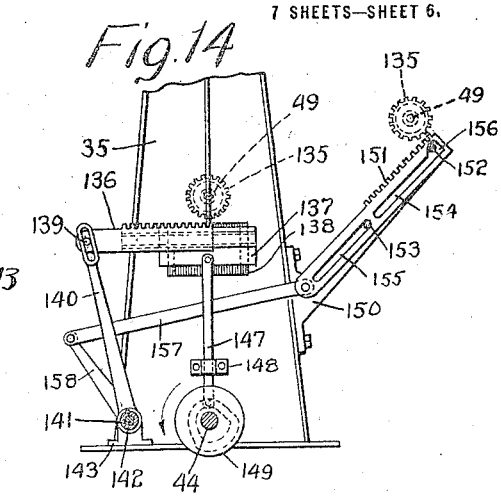
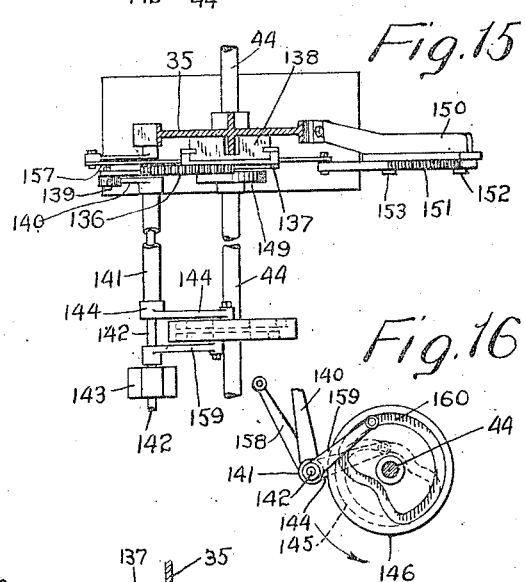
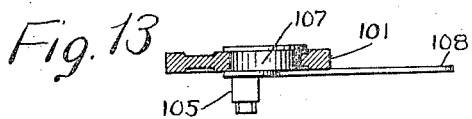
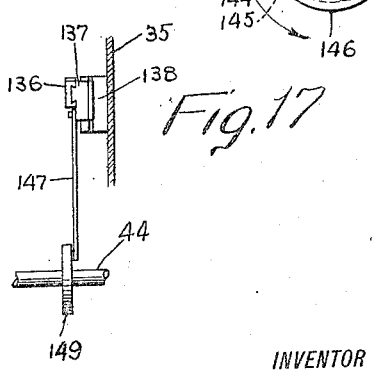
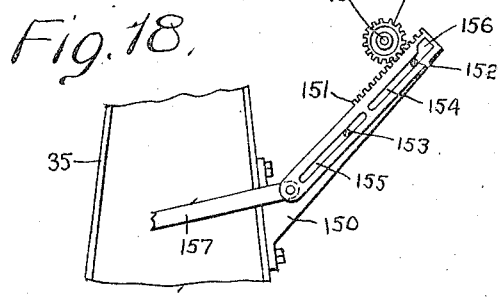
WITNESSES:
H. W. Meade
E. M. Culver
INVENTOR
Jeremiah L. Mahoney
BY
A. M. Wooster
ATTORNEY J. L. MAHONEY.
MACHINE FOR FORMING PLASTIC ARTICLES BY DIPPING.
APPLICATION FILED FEB. 26, 1915.
1,160,923.
Patented Nov. 16, 1915.
7 SHEETS—SHEET 7.
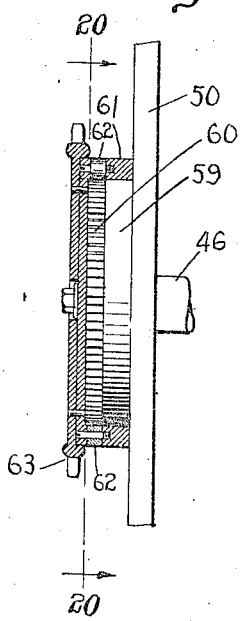
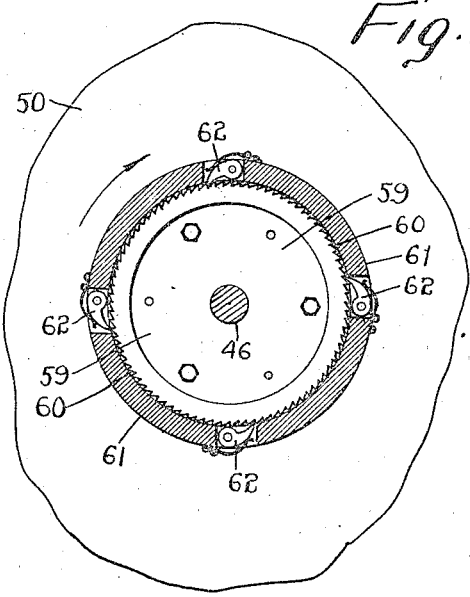
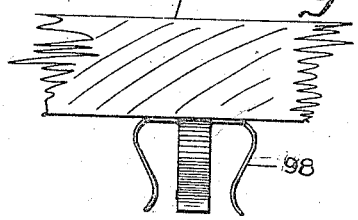
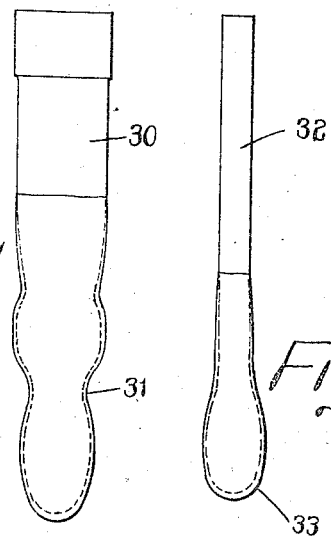
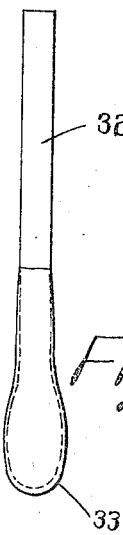
WITNESSES:
H. W. Meade
E. M. Culver
INVENTOR
Jeremiah L. Mahoney
BY
ATTORNEY

UNITED STATES PATENT OFFICE.

JEREMIAH L. MAHONEY, OF NEW HAVEN, CONNECTICUT.

MACHINE FOR FORMING PLASTIC ARTICLES BY DIPPING.

1,160,923.  Specification of Letters Patent.  Patented Nov. 16, 1915.

Application filed February 26, 1915. Serial No. 10,726.

*To all whom it may concern:*

Be it known that I, JEREMIAH L. MAHONEY, a citizen of the United States, residing at New Haven, county of New Haven, State of Connecticut, have invented an Improvement in Machines for Forming Plastic Articles by Dipping, of which the following is a specification.

This invention relates to apparatus for forming articles of plastic material, more particularly for making hollow rubber articles, such, for example, as nursing bottle nipples, medicine dropper bulbs and the like, by what is known as the "dipping process".

The invention has for its general object to provide an automatic machine whereby such articles may be rapidly and inexpensively produced in large quantities and of a high and uniform quality with a minimum amount of manual labor or skilled attention.

Figure 1:
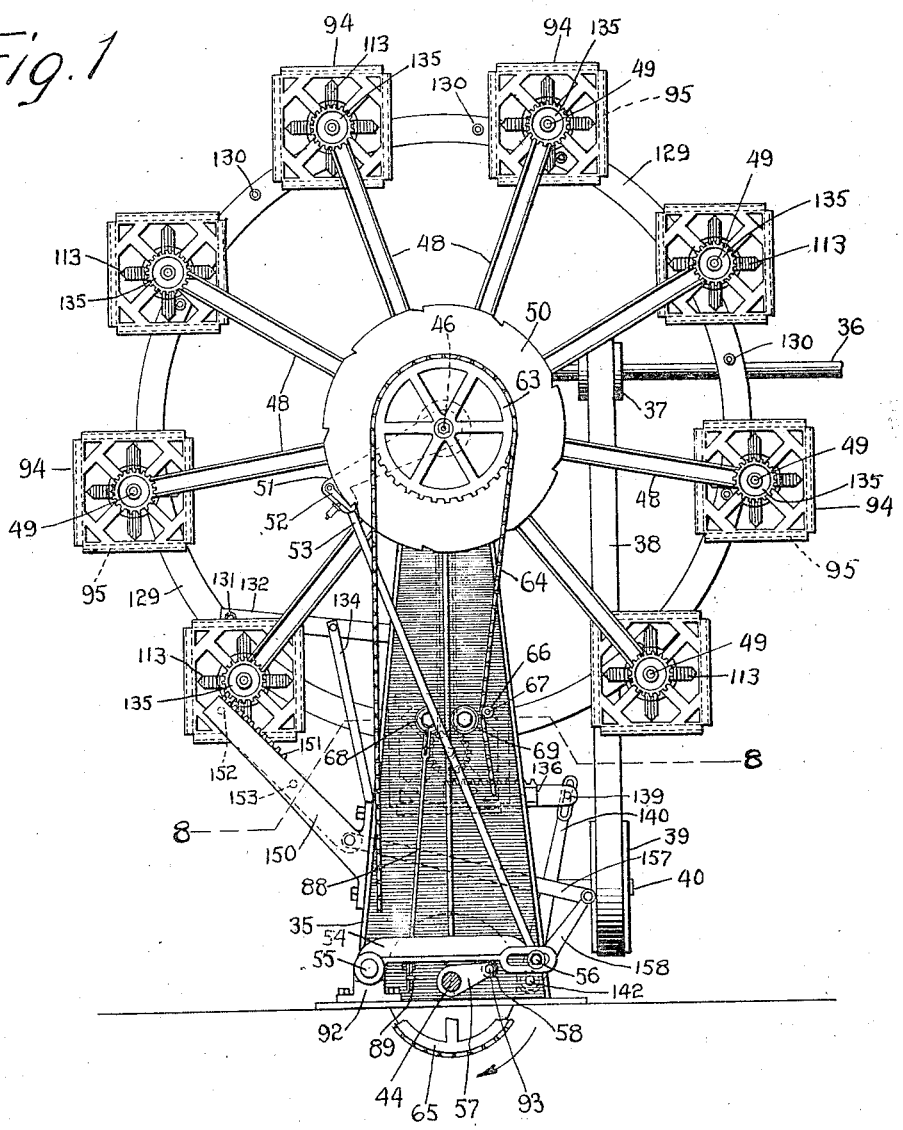
Figure 2:
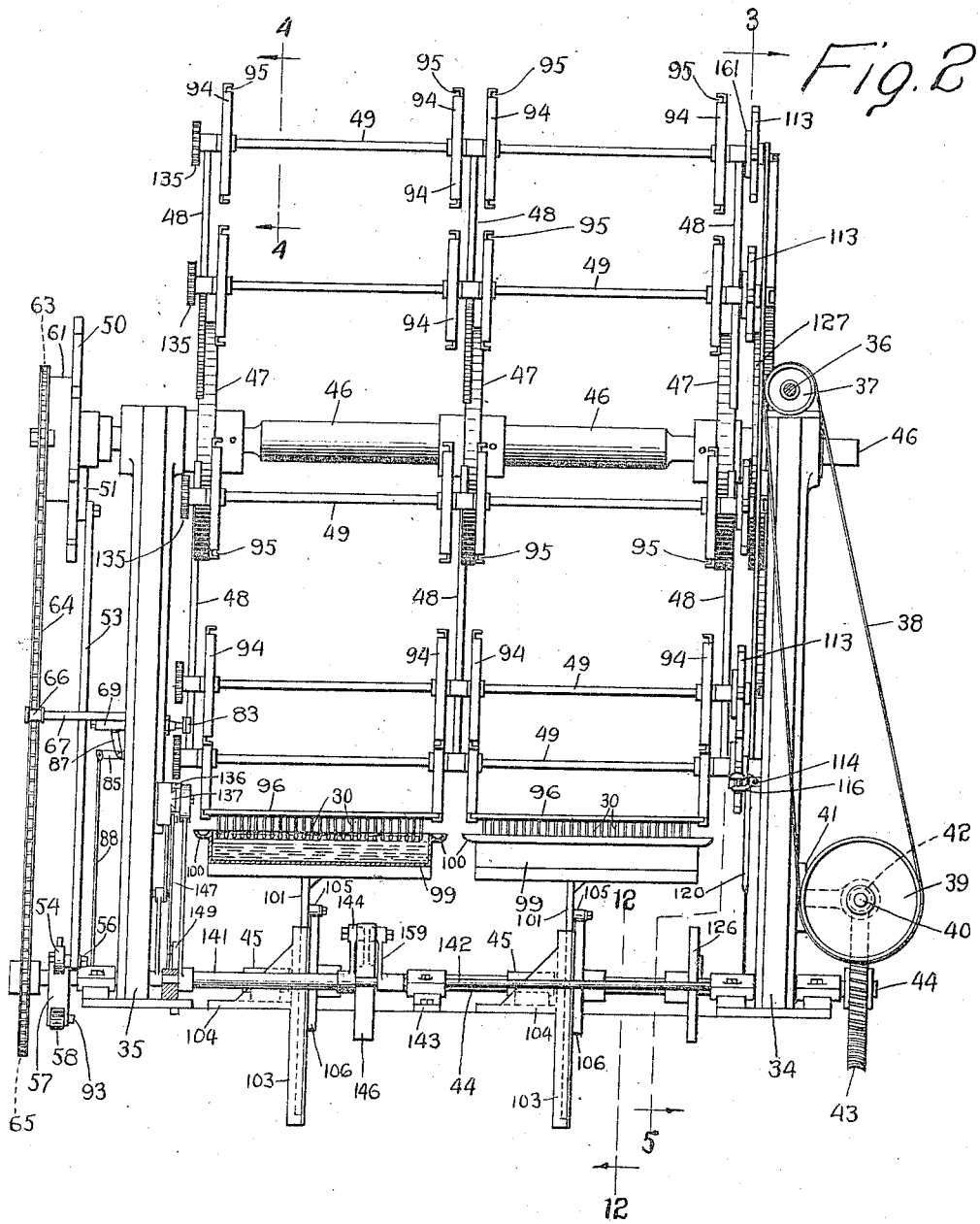
Figure 3:
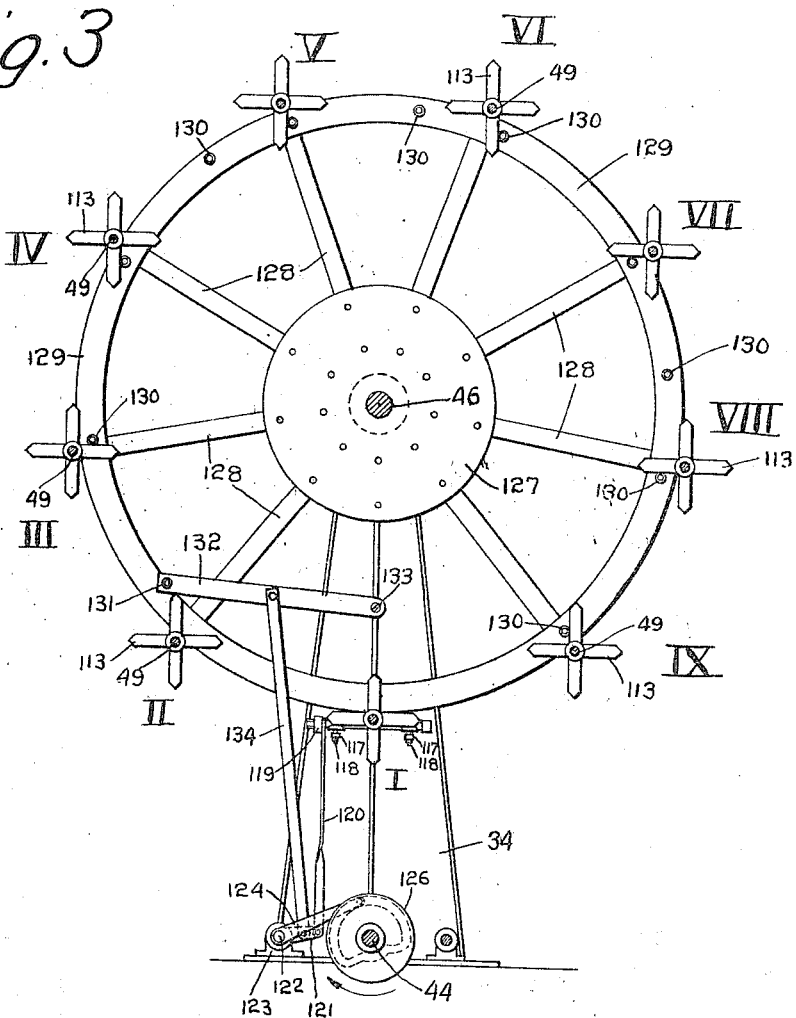
Figure 4:
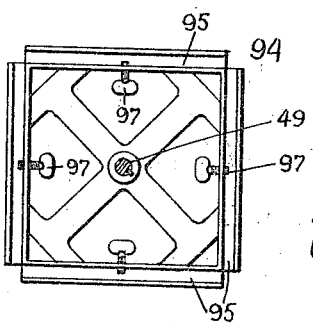

With the foregoing and other objects in view I have devised the novel machine which I will now describe, reference being had to the accompanying drawings in which:

Figure 1 is an end elevation of the machine, partly broken away to show the cam shaft in section. Fig. 2 is a side or front elevation, as viewed from the right in Fig. 1, showing one of the dipping tanks in section. Fig. 3 is a section substantially on the line 3, Fig. 2. Fig. 4 is a detail sectional view of one of the dipping frames taken substantially on line 4—4, Fig. 2. Fig. 5 is a sectional view on an enlarged scale taken substantially on the line 5, Fig. 2. Fig. 6 is an elevation, partly broken away, of the parts shown in Fig. 5 as viewed from the left in the latter figure. Fig. 7 is a detail view of one of the tension or friction devices applied to the dipping frame shafts as viewed from the line 7—7, Fig. 6. Fig. 8 is a detail section, taken substantially on the line 8—8, Fig. 1, showing the mechanism for locking and positioning the rotating carrying head at each operation. Fig. 9 is a section on the line 9—9, Fig. 8. Fig. 10 is an enlarged detail elevation of certain parts shown at the bottom in Fig. 1 and illustrating the mechanism for operating the parts shown in Fig. 9. Fig. 11 is a detail elevation of certain of the parts shown in Fig. 10 as viewed from the left in the latter figure. Fig. 12 is a detail sectional view taken substantially on the line 12—12, Fig. 2, and showing the mechanism for operating one of the dipping tanks. Fig. 13 is a detail section taken substantially on the line 13—13, Fig. 12. Fig. 14 is a detail elevation of the mechanism adjacent the left end upright shown in Fig. 2 for operating or rotating the dipping frames after the dipping operation. Fig. 15 is a plan view of the parts shown in Fig. 14 and others adjacent thereto. Fig. 16 is a detail elevation of one of the cams shown in Fig. 15 and parts coöperating therewith. Fig. 17 is a fragmentary elevation of certain parts shown in Fig. 14 as viewed from the right in the latter figure. Fig. 18 is a detail elevation of certain parts shown in Fig. 14, showing these parts in a different position. Fig. 19 is a side elevation, partly in section, illustrating certain clutch mechanism hereinafter referred to. Fig. 20 is a section on the line 20—20, Fig. 19. Fig. 21 is a detail view of a dipping form suitable for use in the machine for the purpose of forming nursing bottle nipples and showing a partly completed nipple in place thereon. Fig. 22 is a view similar to Fig. 21 showing a form suitable for making medicine dropper bulbs. Fig. 23 is a fragmentary view of one of the dipping boards, showing a form of clip suitable for use in connection with the dipping form shown in Fig. 21.

The machine forming the subject of the present invention operates to produce hollow rubber or other plastic articles of the general character above referred to by what is known as the "dipping process", which consists in dipping suitably shaped forms into a liquid rubber or other solution, composition or cement, thereby forming a coating or deposit of said solution or cement upon the form, which coating or deposit subsequently dries to constitute the desired article, which, after finishing and vulcanization, is stripped from the form. In order to produce an article of the desired thickness several successive dippings are usually required, and after each dipping and before the drying or setting of the coating applied thereby to the form, said form must be repeatedly turned or changed in position in order to prevent the liquid solution or composition from completely draining off and to cause the same to set as a deposit of even thickness.

In Fig. 21 is shown one of the dipping forms 30 suitable for the manufacture, as above described, of nursing bottle nipples, said form having thereon a deposit 31 produced by one or more dippings and which deposit constitutes a partly completed nipple.

In Fig. 22 is shown another form 32 suitable for the manufacture of medicine dropper bulbs and having thereon a deposit 33 representing a partially completed bulb.

For convenience the machine is herein shown and described in connection with the operation of forming nursing bottle nipples, but it will be understood that with slight modification, particularly in the shape or character of the dipping forms used, the machine would operate equally well to form finger cots, balloons, bathing caps, gloves, or any other article capable of manufacture by the dipping process.

Referring to Figs. 1 and 2, the frame of the machine, as shown, comprises a pair of end uprights 34 and 35 secured to a suitable base, floor or foundation, which latter is preferably formed with suitable recesses or pits for the reception of such parts of the machine as project below the upper level thereof 36 denotes the driving or power shaft suitably journaled at the top of the upright 34 and receiving power from any suitable source. 37 denotes a pulley fast upon the shaft 36 and connected by a belt 38 with a pulley 39 fast on a countershaft 40 suitably journaled in brackets 41 secured to the upright 34. 42 denotes a worm on the shaft 40 which meshes with a worm gear 43 on a cam shaft 44 journaled in the uprights 34 and 35 adjacent the lower ends of the latter, and, if necessary, at one or more intermediate points in bearings fixed to the machine base as indicated, for example, at 45 in Fig. 2. 46 denotes the shaft of the intermittently rotating carrying head, which shaft is journaled in the uprights 34 and 35 adjacent the upper ends of the latter. 47 denotes disks which are pinned or otherwise rigidly secured to the shaft 46. The disks 47 may be of any suitable number in accordance with the desired capacity of the machine. As herein shown the machine is equipped with two sets of dipping frames coöperating with two dipping tanks, as will presently be explained. Accordingly, in the present embodiment of the invention, three disks 47 are provided, one adjacent each of the uprights 34 and 35 and constituting the ends of the rotating head, and one arranged on the shaft 46 midway between the first two and dividing said rotating head into two sections to accommodate the two sets of dipping frames. 48 denotes radiating arms bolted or otherwise rigidly secured to the disks 47, said arms for purposes of lightness and rigidity being preferably channel or U-shaped in cross section, as shown in Figs. 1 and 8. The arms 48 may be of any suitable number, but preferably, and as herein shown, nine correspondingly arranged arms are carried by each of the disks 47, thus providing for nine dipping frames in each set and for nine successive positions in each complete rotation of the head, as hereinafter explained. 49 denotes the dipping frame shafts which are rotatably mounted in suitable journals carried by the outer ends of the arms 48. 50 denotes an operating or ratchet disk fixed to the shaft 46 outside the upright 35 and provided with a series of notches preferably equal in number to the arms 48 and herein shown as nine. 51 denotes an oscillating pawl arm or carrier loosely mounted on the shaft 46 adjacent the disk 50 and carrying at its end a preferably spring pressed pawl 52 coöperating with said ratchet disk 50. The pawl arm 51 is connected by means of a link or connecting rod 53 with a lever 54 pivoted on a stud 55 carried by a suitable fixed bracket 92 at the base of the machine. The end of the lever 54 is preferably slotted to receive an adjustable clamp bolt 56 to which the end of the link or connecting rod 53 is pivoted. By adjusting the pivot 56 with reference to the slotted end of the lever 54 the stroke of the pawl arm 51 may be varied for the purpose of securing proper operation. 57 denotes an arm keyed or otherwise fixed upon the cam shaft 44 and carrying at its end a pin or stud 93 upon which is journaled a roller 58 adapted to engage the lever 54 (see also Fig. 10). At each complete rotation of the shaft 44 engagement of the roller 58 with the lever 54 causes the pawl arm 51 to be oscillated or swung on the shaft 46 and the ratchet disk 50, together with the rotating carrying head, to be rotated or angularly moved one step, or, in the present embodiment of the invention, one-ninth of a complete rotation.

To prevent shocks and overrunning of the carrying head due to the momentum caused by the relatively great weight of said head and the relatively sudden impulse in starting caused by the engagement of the roller 58 with the lever 54, the following mechanism is provided, reference being had to Figs. 1, 2, 19 and 20: 59 denotes a disk or flat cylindrical inner clutch member bolted or otherwise secured to the outer face of the operating disk 50 and provided at its outer end with a peripheral series of ratchet teeth 60. 61 denotes an outer clutch member or pawl carrier rotatably mounted on the inner cylindrical portion of the clutch member or ratchet wheel 59 and provided with a series of spring pressed pawls 62. The pawls 62 are preferably so positioned on the member 61 that only one pawl at a time is in complete operative engagement with a tooth 60 on the disk 59, the spacing of said pawls being disproportionate to or not exactly commensurate with the spacing of said teeth, so that by providing a suitable number of pawls 62 one of said pawls may be at substantially all times in complete operative engagement with said disk without the necessity of cutting the teeth 60 undersirably small. 63 denotes a sprocket wheel bolted or otherwise fixed to the pawl carrier 61 and connected by a sprocket chain 64 with a sprocket wheel 65 keyed or otherwise fixed on the cam shaft 44, said sprocket chain preferably passing over an idler 66 rotatably mounted on a stud 67 projecting from the outer face of the upright 35 for the purpose of preventing undue slack in said sprocket chain. The arrangement and proportions of the parts are such that the pawl carrier 61 is rotated from the shaft 44 through the sprockets 65 and 63 and chain 64 at an angular velocity substantially equal to the maximum angular velocity imparted to the disk 50 from the shaft 44 through the lever 54, connecting rod 53 and pawl 52, and in the same direction, this direction in the construction shown being clockwise as viewed in Fig. 1 and as indicated by the arrow on Fig. 20. When the carrying head is at rest or is moving at a speed less than its predetermined maximum the pawls 62 are moved idly over the ratchet teeth 60. Should, however, the carrying head, by reason of momentum or otherwise, start to move at a speed greater than this predetermined maximum, tending to turn the disk 59 in a clockwise direction relative to the pawl carrier 61, this movement will be prevented by engagement of a pawl 62 with the teeth 60, and the incipient increase of speed immediately checked. In other words, the mechanism last described permits the carrying head to remain at rest or to rotate as fast as or slower than a predetermined velocity but prevents any excess of speed.

For the purpose of preventing overthrow of the carrying head beyond the positions into which it is positively turned by the disk 50 and pawl 52, and for the purpose of positioning said head after each forward movement, the following mechanism is provided, reference being had to Figs. 1, 2 and 8 to 11: 68 and 69 denote spaced sleeves passing through suitably disposed openings in the upright 35 and held in place therein by means of shoulders 70, formed on said sleeves and engaging the outer face of said upright, and nuts 71 on the threaded inner ends of said sleeves and engaging the inner face of said upright. 72 denotes a rod or plunger slidably mounted in the sleeve 68, and 73 a similar plunger in the sleeve 69. The rods or plungers 72 and 73 are normally pressed inwardly or toward the right in Figs. 8 and 9 by means of springs 74 and 75 which surround reduced portions of said rods or plungers and engage at their opposite ends exterior shoulders on said rods and interior shoulders in the sleeves 68 and 69, said inward movement being limited by nuts 76 and 77 on the outer ends of said rods or plungers and adapted to engage the outer ends of said sleeves. The rods 72 and 73 are held against rotation or angular movement in the sleeves 68 and 69 by means of pins 78 and 79 projecting from said rods respectively and operating in slots 80 and 81 in the sleeves 68 and 69. 82 and 83 denote heads on the inner ends of the rods or plungers 72 and 73 respectively, the adjacent sides of said heads being separated by a space substantially equal to the width of the arms 48. The head 82 is preferably substantially square, while the head 83 is beveled at its outer side, as indicated at 84, the bevel being preferably formed on an elongated lateral extension of said head. As the carrying head is rotated in a clockwise direction, as viewed in Fig. 1, the arms 48, when adjacent their lowermost position, move in the direction of the arrow on Fig. 8. As each arm 48 is brought into engagement with the beveled surface 84 on the head 83, said head is moved outwardly, or toward the left in Fig. 8, against the tension of the spring 75, into the position shown in dotted lines in Fig. 8, thereby permitting said arm to pass said head. As soon as the arm 84 has passed the head 83 it is brought into engagement with head 82 and positively stopped thereby, the parts being so proportioned and arranged that this takes place upon the completion of the positive movement of the disk 50 by the pawl 52, so that overthrow of the carrying head by reason of momentum is prevented. Immediately after an arm 48 has passed the head 83 said head is moved inwardly by the spring 75 into a position immediately in the rear of said arm 48, as shown in full lines in Fig. 8, thereby preventing rebound or reverse movement of the carrying head.

In order to permit further forward movement of the arm 48 thus positioned between the heads 82 and 83, that is to say further rotation of the carrying head in a clockwise direction as viewed in Fig. 1, it is necessary that the head 82 be momentarily withdrawn, and for this purpose the following mechanism is provided: 85 (Fig. 9) denotes a bell crank lever pivoted at 86 to a bracket 87 suitably supported in the machine and preferably from the sleeve 68. The upper end of said bell crank lever engages the inner side of the pin 78 which projects from the plunger 72, while the lower end of said bell crank lever is connected by means of a link or connecting rod 88 to one arm of a lever 89 pivoted at 90 to a bracket 91 suitably secured in stationary position as by being bolted to the bracket 92. The free end of the lever 89 extends into the path of movement of the stud 93 upon which the roller 58 is journaled, said stud being for this purpose extended beyond the inner face of the arm 57. The arrangement and proportion of parts is such that during the rotation of the cam shaft 44, and prior to the engagement of the lever 54 by the roller 58, the stud 93 engages the free end of the lever 89, thereby rocking said lever and, through the connecting rod 88, rocking the lever 85 in a direction to cause the upper end of the latter lever, by engagement with the pin 78, to withdraw the head 82 from the path of movement of the arms 48. Thereafter the roller 58 is brought into engagement with the lever 54 and moves the same to cause a fractional rotation of the carrying head, as above explained. After the movement of the carrying head has started, and after the arm 48 previously in engagement with the head 82 has been moved beyond said head, the stud 93 passes out of engagement with the end of the lever 89, permitting the spring 74 to move the head 82 inwardly into a position to be engaged by the next arm 48 upon the completion of the movement of the carrying head. Upon the shafts 49, which are journaled in the outer ends of the arms 48, are mounted the dipping or carrying frames which in turn carry the dipping forms above referred to. As herein shown each of the shafts 49 carries two complete dipping frames, although, as above stated, the precise number may be in accordance with preference or requirement. Each complete dipping frame comprises a pair of end members or heads 94 (see Figs. 1, 2 and 4) keyed or otherwise fixed upon the corresponding shaft 49. Each end member or head is preferably rectangular in form, and the two heads of each pair are correspondingly angularly positioned upon the shaft 49. Upon their inner faces adjacent their edges the heads 94 are provided with grooves 95 adapted removably to receive the dipping boards 96 (see Fig. 23 and bottom of Fig. 2) which constitute the form carriers or holders. The dipping boards 96 are held in operative position in the grooves 95 by means of manually operated set or clamp screws 97 (see Fig. 4). The dipping boards 96 are provided with suitable means for holding the dipping forms 30. As shown in Fig. 23 said holding means comprises a set of spring arms 98 adapted particularly to engage the end of a nipple form 30 such as shown in Fig. 21. It will of course be understood that the form holding means on the dipping boards or carriers 96 will be of a construction and arrangement depending upon the particular character of dipping forms in use. It will also be understood that the dipping forms are secured to the dipping boards 96 in positions perpendicular thereto with their forming ends outward as shown in Fig. 2.

Referring to Fig. 2, 99 denotes dipping tanks equal in number to the dipping frames on each shaft 49 and herein shown as two. Where a plurality of dipping tanks 99 are employed, as in the present instance, said tanks may, if desired, contain solutions or compositions of different characters, as for example different colors. The tanks 99 are located immediately beneath the dipping frames, when the latter are in their lowermost position, and are raised to cause the dipping forms on the dipping boards carried by the lowermost sides of said dipping frames to be immersed in the liquid in said tanks, said tanks being thereafter lowered to permit the turning of the carrying head as above explained. 100 denotes gutters surrounding the upper edges of the tank 99. The tanks 99 are kept filled with solution or liquid composition, preferably continuously, from any suitable source (not shown), the surplus solution overflowing into the gutters 100 and being drained therefrom by any suitable means (not shown). In this manner the level of the liquid in the tanks 99 may always be maintained at precisely the upper edges of said tanks, so that, as said tanks are always raised to the same predetermined point, the dipping forms 30 will always be immersed in the solution to a constant predetermined depth. For periodically raising and lowering the tanks 99 between the periods of movement of the intermittently rotating carrying head the following mechanism is provided, reference being had to Figs. 12 and 13. As this mechanism is the same for each tank it will be described with reference to one only. 101 denotes a slide upon the upper end of which the tank 99 is mounted, said slide having a vertical slot 102 through which the cam shaft 44 passes, and being guided for vertical movement in ways 103 suitably fixed in position, as by being carried by brackets 104 (see Fig. 2) secured to the base of the machine. 105 denotes a cam roller carried by the slide 101 and coöperating with an edge cam 106 secured to the cam shaft 44. The direction of rotation of the cam 106 is as indicated by the arrow on Fig. 12, and the form of said cam is preferably such as to produce, first, a relatively quick upward movement of the tank 99 to its maximum height, thereby immersing the dipping forms 30 to the predetermined point, then a slow and more or less gradual downward movement of said tank until the dipping forms are clear of the liquid, and thereafter a quick downward movement of said tank followed by a final period of rest with said tank in its lowermost position. In order to enable the point of maximum elevation of the tank 99, and consequently the depth of immersion of the dipping forms, to be adjusted, the cam roller 105 is preferably carried by an eccentric 107 journaled in a suitably disposed opening in the slide 101 and provided with an arm 108 by means of which said eccentric may be turned to raise or lower the roller 105 with respect to the slide 101. 109 denotes a slot in the arm 108 and 110 a slot in a bracket or arm 111 depending from the tank 99 and fixed with respect to the slide 101. 112 denotes a clamp which passes through the slots 109 and 110 and which may be tightened to secure the arm 108 to the arm 111, thereby holding the cam roller 105 in adjusted position. In order that all of the dipping forms 30 on each dipping board 96 may be immersed to the same depth in the liquid in the corresponding tank 99, it is necessary that said boards, prior to the dipping operation, be brought into an exactly level or horizontal position, and to insure this condition the following mechanism is provided, reference being had particularly to Figs. 2, 3, 5 and 6. 113 denotes star wheels keyed or otherwise fixed to the dipping frame shafts 49 at the ends thereof adjacent the upright 34. Each of said star wheels is provided with a number of arms equal to the number of dipping boards carried by each of the dipping frames, herein shown as four, each of said arms being formed with a tapered or pointed end. 114 denotes a rock shaft journaled in a bracket 115 bolted or otherwise secured to the upright 34. 116 denotes a pair of arms fast upon the shaft 114 and carrying at their ends adjustable contact members in the form of adjusting screws 117 provided with heads 118 adapted, when the shaft 114 is rocked in the direction to raise the outer ends of the arms 116, to engage opposite arms of the star wheel 113 then in lowermost position. By properly adjusting the stop screws it will be seen that engagement of said stop screws with the arms of the star wheel 113 may be made to cause the corresponding shaft 49 to occupy an angular position in which the lowermost dipping boards of the corresponding dipping frames will be exactly horizontal. 119 denotes a third arm fast upon the shaft 114 and connected at its end by means of a link or connecting rod 120 with the end of an arm 121 fast upon a rock shaft 122 journaled in a stationary bracket 123 at the base of the machine. 124 denotes a second arm fast upon the shaft 122 and carrying at its end a cam roller 125 coöperating with a path cam 126 fast upon the cam shaft 44. The form of the path cam 126 is such as to cause the shafts 122 and 114 to be rocked to raise the arms 116 and level the dipping boards, as above explained, just prior to the dipping operation, to hold said boards in level position during said operation, and to withdraw the stop screws 117 from engagement with the star wheel 113 at the completion of said operation. After the dipping of the forms in the solution or composition in the tanks 99 it is necessary that the positions of these forms be repeatedly changed in order to prevent the solution from draining off and to cause the same to dry or set in the form of an even coating or layer. For this purpose, as also for the purpose of turning the dipping frames into a position to bring different dipping boards into operative position at the completion of successive cycles or rotations of the carrying head, and for otherwise controlling the dipping frame shafts 49, the following mechanism is provided.

Referring to Figs. 1, 2 and 3, and particularly to the last named figure, 127 denotes a stationary disk concentric with the shaft 46 and bolted or otherwise secured to the inner face of the upright 34. 128 denotes radiating arms bolted or otherwise rigidly secured to the disk 127, said arms being of any suitable number and supporting at their ends a ring or annular frame member 129 whose outer periphery lies just within the path of movement of the axes of the shafts 49. 130 denotes fixed studs preferably provided with rollers projecting from the ring 129 and adapted to be successively engaged by the arms of the star wheels 113 as the carrying head is rotated.

In Fig. 3 the successive positions of each shaft 49, as the carrying head is intermittently rotated, are indicated by the Roman numerals I to IX, position I being the dipping position. A stud 130 is provided on the ring 129 adjacent each position from III to IX inclusive. The arrangement of studs 130 is such that between the positions III and IX each shaft 49, as it is moved from one position to the next, will be rotated through an angle of 180° with reference to a stationary or absolute base, thereby completely reversing the dipping frames carried thereby. This rotary movement is a compound one made up in part of the movement of revolution of the shafts 49 about the axis of the shaft 46 and in part by the rotation of the shafts 49 on their own axes. In order to produce the desired result of completely reversing the dipping frames between each two positions, in addition to a roller 130 at a point corresponding to each position from III to IX, intermediate rollers 130 are provided between positions IV and V, V and VI, and VII and VIII. 131 denotes a stud or roller similar to the studs 130 and corresponding to position II. In order to permit a shaft 49, when in position II, to be independently rotated while the carrying head remains stationary, means are provided whereby the stud 131 may be moved out of position to be engaged by the star wheel 113 when in position II, said means comprising a lever 132 by which the stud 131 is carried, said lever being pivoted at 133 to the end upright 34 and connected by a link 134 with the arm 121 on the rock shaft 122. As above explained, just prior to and during the dipping operation (that is to say while the carrying head is stationary) the shaft 122 is rocked by the cam 126 to effect the leveling of the dipping frame then in dipping position and to hold the same level during the dipping operation, and this movement of the shaft 122 causes the lever 132 to be raised to carry the stud 131 out of the path of movement of the arms of the corresponding star wheel 113, thereby permitting the corresponding shaft 49 to be rotated by means which will presently be described.

Referring now to Figs. 1, 2 and 14 to 18 inclusive, 135 denotes gears or pinions fast upon the dipping frame shafts 49 at the ends thereof opposite the star wheels 113, that is to say at the ends adjacent the upright 35. 136 denotes a rack guided for horizontal movement in suitable ways carried by a slide 137 which, in turn, is guided for vertical movement on ways 138 formed on or secured to the upright 35. 139 denotes a pin carried by the rack 136 and which engages the slotted end of an arm 140 keyed or otherwise fixed to a sleeve 141 loosely or rotatably mounted on a shaft 142 suitably journaled in fixed brackets 143 at the base of the machine. 144 denotes a second arm fast upon the sleeve 141 and carrying at its end a cam roller coöperating with a cam groove 145 in one face of a double faced path cam 146 on the cam shaft 44. 147 denotes an operating rod connected at its upper end to the slide 137 and guided for vertical movement in a suitable bracket 148 secured to the upright 35. The operating rod 147 carries at its lower end a cam roller coöperating with a groove in a path cam 149 on the cam shaft 44. The parts last described are so proportioned and arranged that immediately after the dipping operation, when the tanks 99 have been lowered sufficiently to clear the dipping frames and prior to the forward movement of the carrying head, the slide 137 is raised to carry the rack 136 into mesh with the pinion 135 on the shaft 49 then in lowermost position, and thereafter the sleeve 141 is rocked by the cam groove 145, thereby moving the rack 136 horizontally a sufficient distance to turn the shaft 49 through an angle of approximately 140°. The slide 137 is then lowered to carry the rack 136 out of mesh with the pinion 135, and said rack 136 is moved horizontally into its initial position, leaving the shaft 49 in the position into which it has been turned. 150 denotes a guide bracket bolted or otherwise secured to the upright 35 and extending into a position adjacent the pinion 135 of the shaft 49 which is in position II as indicated in Fig. 3. 152 and 153 denote fixed pins carried by and projecting from the bracket 150. 151 denotes a rack bar provided with slots 154 and 155 which receive the pins 152 and 153, respectively, whereby said rack bar is guided for longitudinal movement on the bracket 150. The slot 154 is formed at its upper or outer end with an enlargement or cam portion 156. 157 denotes a link or connecting rod pivoted at one end to the lower or inner end of the rack 151 and at its opposite end to an arm 158 keyed or otherwise fixed to the shaft 142. 159 denotes a second arm fast upon the shaft 142 and carrying at its end a cam roller which coöperates with a cam groove 160 in the face of the cam 146 opposite to that provided with the groove 145. The parts last described are so constructed and arranged that, while the carrying head is stationary during the dipping operation, the shaft 142 is rocked by the cam groove 160 to impart to the rack 151 one complete reciprocation, that is to say move the same longitudinally outwardly and then inwardly. The normal position of the rack 151 is shown in Fig. 14, in which the pin 152 is in the enlargement 156 of the slot 154, and the rack 151 out of mesh with the pinion 135 on the shaft 49 which is in position II of Fig. 3. As the rack 151 is moved outwardly the first effect is to cause the pin 152, by engagement with the inner edge of the enlargement or cam portion 156, to move said rack into mesh with the pinion 135 as shown in Fig. 18. The continued outward movement of the rack 151 causes the shaft 49 to be rotated through an angle of approximately 180°, thereby completely reversing the dipping frames carried thereby. As the rack 151 moves inwardly the shaft 49 is turned in the opposite direction and returned to its initial position, and at the completion of the inward movement of said rack the pin 152 enters the enlargement 156 and the rack 151 drops out of mesh with the pinion 135.

In order to prevent accidental rotation of the shafts 149 in the carrying head except when positively turned by the mechanisms hereinbefore described, and to hold said shafts with reference to said head in the angular positions in which they are so turned, the following tension or friction mechanism is provided, reference being had to Figs. 6 and 7. It will be understood that this mechanism is the same for each shaft 49 so that only one of these devices is shown and described in detail. 161 denotes a disk or brake drum fast upon the shaft 49 between the star wheel 113 and the adjacent arm 48. 162 denotes a friction or brake band secured at one end to a stud 163 projecting from the arm 48 and at its opposite end to a pin or rod 164 which passes through a diametrical opening in the stud 163 and which is threaded at its outer end to receive a nut 165 between which and the stud 163 is interposed a spring 166. By adjusting the nut 165, and consequently the tension of the spring 166, the tightness of the band 162 upon the drum 161 may be suitably adjusted. This tension is preferably such as to prevent all accidental rotation of the shaft 49 due to looseness or otherwise, without, however, opposing an objectionable amount of frictional resistance to the rotation of said shaft by its positive operating mechanisms.

The complete operation of the machine is as follows. Provision having been made for supplying the dipping tanks 99 with suitable solution or liquid composition, dipping forms of the desired character are applied to the dipping boards 96 and said dipping boards placed in position in the dipping frames, each of said frames being preferably provided with four boards and each of said boards being preferably supplied with its full set of dipping forms, said dipping boards being so placed in the dipping frames that the forms project outwardly from said frames. All of the dipping frames having been thus supplied, and one pair of said frames being in the lowermost position, or in position I of Fig. 3, the cam 126, operating through the rock shafts 122 and 114, causes the leveling mechanism to position said lowermost dipping frames so as to insure the horizontal positioning of the dipping boards on their under sides. The cams 106 then raise the dipping tanks 99, causing the dipping forms 30 to be immersed in the liquid therein to a predetermined depth, after which said tanks recede. As the dipping tanks 99 descend, the leveling mechanism releases the corresponding star wheel 113, and, when said tanks and leveling mechanism have receded to a sufficient extent to clear the dipping frames and star wheel respectively, the cam 149 raises the rack 146 into mesh with the corresponding pinion 135 and the cam 145 moves said rack to turn said pinion through approximately 140°, leaving said pinion in the position into which it has been turned. The arm 57, acting through the ratchet mechanism 52, 50, thereupon advances the carrying head one step, said head being properly positioned after this forward movement by the plungers 72 and 73 as above explained. The dipping frames previously in position I, as indicated in Fig. 3, have now been moved into position II. It will of course be understood that at each operation of the machine, that is to say after each forward movement of the carrying head, a dipping operation takes place with respect to a set of dipping forms carried by the dipping frame at that time in position I. For convenience of description, however, the cycle of operations will be explained with respect to the parts associated with a single shaft 49. As the dipping forms are brought into position II their movement of translation or revolution about the axis of the shaft 46, combined with the axial rotation previously imparted to the shaft 49 by the rack 136, causes said forms to be completely reversed or rotated through 180°, thereby bringing the dipping forms which have just been immersed to the top. This new positioning of the forms is assisted by the engagement of the corresponding star wheel 113 with the stud 131 which is at this time depressed. During the next period of rest of the carrying head the stud 131 is elevated into the position shown in Fig. 3 by the cam 126 and intermediate mechanism, thereby releasing the star wheel 113. The cam 160, through the rock shaft 142 and intermediate connections, thereupon actuates the rack 151, which causes the dipping forms in position II to be again reversed and then returned. The cam 126 thereupon lowers the lever 132 and stud 131, and upon the next forward movement of the carrying head, transferring the dipping forms from position II to position III, engagement of the star wheel with the stud 131 causes the shaft 49 to be rotated a certain amount, and this rotation, combined with the movement of translation or revolution of the forms, causes them to be again reversed or turned through an angle of 180° as they are brought into position III. Thereafter, as above explained, as the dipping forms are moved successively into positions IV, V, VI, VII, VIII and IX, said forms are, at each step, reversed or turned through an angle of 180° by engagement of the star wheel 113 with the studs 130, said studs being suitably positioned to produce this result. As the frames are moved from position IX to position I, however, they are turned through an angle of 90° only, thereby bringing into dipping position dipping boards other than those containing the forms previously dipped. This operation is continued, each set of forms being dipped at every fourth complete rotation of the carrying head and the speed of operation being such as to permit each deposit of solution or composition to dry or set to the desired extent between successive immersions of the same set of forms. When a sufficient number of immersions have taken place to produce a deposit of the desired thickness on the forms, the attendant may, at each forward step of the carrying head, remove the lowermost dipping board of the dipping frame in position IX and replace the same with one containing fresh forms. In this way the operation of the machine may be made continuous.

It will thus be seen that provision is made whereby each set of dipping forms may be automatically and repeatedly immersed in the solution or composition in the dipping tanks, whereby after each immersion said forms are so turned or manipulated as to prevent the wet solution from draining off or setting unevenly, and whereby ample time is afforded between successive immersions to permit the deposit on each form to set or dry properly, the last named result being accomplished without interrupting the continuous operation of the machine. It will be understood that during a second rotation of the carrying head the dipping forms which are dipped on a first rotation are held in horizontal positions alternately at opposite sides of the dipping frames as the latter are reversed, the dipping forms last dipped being in each case held in vertical position alternately at the upper and lower sides of said frames. Immediately after the dipping of a set of forms, and while the solution or composition thereon is still in a thin or highly fluid condition, it is necessary that these forms be reversed more rapidly than is necessary later when the deposit has time to dry or set to a certain extent. This quickly repeated reversal of the forms is accomplished, when said forms are in positions I and II, by the racks 136 and 151, as above explained, the forms during the subsequent rotation of the carrying head being completely reversed once at each forward step.

It will also be seen that, although a considerable time is necessary to form a deposit of the desired thickness upon a single form, inasmuch as several immesions are usually necessary and time must be allowed for the setting or drying of the several deposits between successive immersions, the possible capacity of the machine is so great that a large number of articles may be in course of production at the same time, so that the time consumed per article is relatively small. The machine herein shown, and chosen as an illustrative embodiment of the invention, is capable of carrying, at one time, from 35,000 to 40,000 dipping forms suitable for the production of nursing bottle nipples, and of completing said nipples in from seven to ten hours. In other words, the possible output of this machine is from 3,500 to 5,500 nipples per hour or more, this result being accomplished without the expenditure of any very considerable amount of manual labor or skilled attention.

It will be furthermore seen that by reason of the mechanical provisions above described, all of the dipping forms are subjected to the same operations with mechanical exactness, so that the articles formed will all be of a uniform grade, that is to say of uniform size and thickness, and each of a substantially even thickness throughout, results which it is practically impossible to secure by the method of hand dipping as usually practised.

Having thus described my invention I claim and desire to secure by Letters Patent:—

1. In a machine of the character described, in combination, means for holding a set of dipping forms, a dipping tank provided with an overflow gutter extending about the upper edge thereof, and means for relatively moving said form holding means and tank to immerse said forms in the liquid in said tank.

2. In a machine of the character described, in combination, means for holding a set of dipping forms, a dipping tank, means for relatively moving said holding means and tank to immerse said forms in the liquid in said tank, and means for leveling said holding means to cause said forms to be dipped to an equal depth in said tank.

3. In a machine of the character described, in combination, a shaft, means on said shaft for holding a set of dipping forms, a dipping tank, means for relatively moving said holding means and tank to immerse said forms in the liquid in said tank, leveling means, and means on said shaft engaged by said leveling means for angularly positioning said shaft to level said holding means.

4. In a machine of the character described, in combination, a shaft, means on said shaft for holding a set of dipping forms, a dipping tank, means for relatively moving said holding means and tank to immerse said forms in the liquid in said tank, a rock shaft, a pair of arms on said rock shaft, and means on said first-named shaft engaged by said arms to level said holding means.

5. In a machine of the character described, in combination, a shaft, means on said shaft for holding a set of dipping forms, a dipping tank, means for relatively moving said holding means and tank to immerse said forms in the liquid in said tank, a rock shaft, a pair of arms on said rock shaft, adjustable contact members carried by said arms, and means on said first-named shaft engaged by said contact members to level said holding means.

6. In a machine of the character described, in combination, a shaft, means on said shaft for holding a set of dipping forms, a dipping tank, means for relatively moving said holding means and tank to immerse said forms in the liquid in said tank, a rock shaft, a pair of arms on said rock shaft, adjustable stop screws carried by said arms and provided with heads, and means on said first-named shaft engaged by the heads of said stop screws to level said holding means.

7. In a machine of the character described, in combination, a shaft, means on said shaft for holding a set of dipping forms, a dipping tank, means for relatively moving said holding means and tank to immerse said forms in the liquid in said tank, a rock shaft, a pair of arms on said rock shaft, means on said first-named shaft engaged by said arms to level said holding means, a third arm on said rock shaft, a link connected at one end to said last-named arm, a second rock-shaft provided with an arm connected to the other end of said link, a second arm on said last-named rock shaft, and a cam coöperating with said last-named arm.

8. In a machine of the character described, in combination, a shaft, means on said shaft for holding a set of dipping forms, a dipping tank, means for relatively moving said holding means and tank to immerse said forms in the liquid in said tank, a star wheel on said shaft, and means coöperating with said star wheel for leveling said holding means.

9. In a machine of the character described, in combination, a shaft, means on said shaft for holding a set of dipping forms, a dipping tank, means for relatively moving said holding means to immerse said forms in the liquid in said tank, a star wheel on said shaft, a rock shaft, a pair of arms on said rock shaft, adjustable stop screws carried by said arms and provided with heads adapted to engage said star wheel to level said holding means, a third arm on said rock shaft, a link connected at one end to said last named arm, a second rock shaft provided with an arm connected to the other end to said link, a second arm on said last-named rock-shaft, and a cam coöperating with said last-named arm.

10. In a machine of the character described, in combination, means for holding a set of dipping forms, a dipping tank, and means for relatively moving said holding means and tank to immerse said forms in the liquid in said tank, said last-named means comprising a slide by which one of said parts is carried, a cam, a roller on said slide coöperating with said cam, and means for adjusting said roller on said slide.

11. In a machine of the character described, in combination, means for holding a set of dipping forms, a dipping tank, and means for relatively moving said holding means and tank to immerse said forms in the liquid in said tank, said last-named means comprising a slide by which one of said parts is carried, a cam, a roller coöperating with said cam, and an eccentric journaled in said slide and by which said roller is carried.

12. In a machine of the character described, in combination, means for holding a set of dipping forms, a dipping tank arranged beneath said holding means, a vertically movable slide by which said tank is carried, a cam, a roller coöperating with said cam, and an eccentric journaled on said slide and by which said roller is carried, said cam coöperating with said roller to raise said tank and immerse said forms in the liquid therein to a depth determined by the adjustment of the said eccentric.

13. In a machine of the character described, in combination, means for holding a set of dipping forms, a dipping tank, and means for relatively moving said holding means and tank to immerse said forms in the liquid in said tank, said last-named means comprising a slide by which one of said parts is carried, a cam, a roller coöperating with said cam, an eccentric journaled in said slide and by which said roller is carried, a slotted operating arm for said eccentric, a slotted arm carried by said slide, and a clamp for adjustably connecting said arms.

14. In a machine of the character described, in combination, a carrying head having a plurality of arms, form holders carried by said arms respectively, forms carried by said holders, means for applying coating to said forms, means for intermittently moving said carrying head to present said form holders successively to said coating applying means, and means coöperating with said arms successively and engaging said arms at opposite sides for positioning said carrying head at each operation thereof.

15. In a machine of the character described, in combination, a carrying head having a plurality of arms, form holders carried by said arms respectively, forms carried by said holders, means for applying coating to said forms, means for intermittently moving said carrying head to present said form holders successively to said coating applying means, and a pair of plungers each provided with heads adapted to engage at opposite sides the several arms successively for positioning said carrying head at each operation thereof.

16. In a machine of the character described, in combination, a carrying head having a plurality of arms, form holders carried by said arms respectively, forms carried by said holders, means for applying coating to said forms, means for intermittently moving said carrying head to present said form holders successively to said coating applying means, a pair of plungers each provided with heads adapted to engage at opposite sides the several arms successively for positioning said carrying head at each operation thereof, the head of one of said plungers being beveled on its outer side to permit said arms to pass the same, and a spring for returning said plunger and head to operative position behind an arm which has passed said head.

17. In a machine of the character described, in combination, a carrying head, a plurality of form holders carried by said head, forms carried by said holders, means for applying coating to said forms, means for intermittently moving said carrying head to present said form holders successively to said coating applying means, a plunger coöperating with said carrying head for positioning the same at each operation thereof, and means for withdrawing said plunger to permit said carrying head to move.

18. In a machine of the character described, in combination, a carrying head having a plurality of arms, form holders carried by said forms respectively, forms carried by said holders, means for applying coating to said forms, means for intermittently moving said carrying head to present said form holders successively to said coating applying means, a pair of plungers provided with heads adapted to engage at opposite sides the several arms successively for positioning said carrying head at each operation thereof, the head of one of said plungers being beveled on its outer side to permit said arms to pass the same, a spring for returning said last-named plunger and head to operative position behind an arm which has passed said head, and means for withdrawing the other of said plungers from the path of movement of said arms to permit said carrying head to move.

19. In a machine of the character described, in combination, a carrying head, a plurality of form holders carried by said head, forms carried by said holders, means for applying coating to said forms, actuating means for intermittently moving said carrying head to present said form holders successively to said coating applying means, a plunger coöperating with said carrying head for positioning the same at each operation thereof, and means operated by said actuating means for withdrawing said plunger to permit said carrying head to move.

20. In a machine of the character described, in combination, a carrying head having a plurality of arms, form holders carried by said arms respectively, forms carried by said holders, means for applying coating to said forms, means for intermittently moving said carrying head to present said form holders successively to said coating applying means, a plunger coöperating with said arms successively for positioning said carrying head at each operation thereof, a bell crank lever for withdrawing said plunger to permit said carrying head to move, a lever operatively connected with said bell crank lever, a shaft, an arm on said shaft, and a stud on said arm for engaging and operating said last-named lever.

21. In a machine of the character described, in combination, a carrying head having a plurality of arms, form holders carried by said arms respectively, forms carried by said holders, means for applying coating to said forms, means for intermittently moving said carrying head to present said form holders successively to said coating applying means, a pair of plungers each provided with heads adapted to engage at opposite sides the several arms successively for positioning said carrying head at each operation thereof, sleeves in which said plungers are slidably mounted, said sleeves having slots, springs on said plungers within said sleeves for moving said plungers into operative position, and pins projecting from said plungers and guided in said slots.

22. In a machine of the character described, in combination, a carrying head having a plurality of arms, form holders carried by said arms respectively, forms carried by said holders, means for applying coating to said forms, means for intermittently moving said carrying head to present said form holders successively to said coating applying means, a pair of plungers each provided with heads adapted to engage at opposite sides the several arms successively for positioning said carrying head at each operation thereof, sleeves in which said plungers are slidably mounted, said sleeves having slots, springs on said plungers within said sleeves for moving said plungers into operative position, pins projecting from said plungers and guided in said slots, a bell crank lever engaging the pin on one of said plungers for withdrawing said plunger from operative position, a lever operatively connected with said bell-crank lever, a shaft, an arm on said shaft, and a stud on said arm for engaging and operating said last-named lever.

23. In a machine of the character described, the combination with a carrying head comprising a shaft, disks fast on said shaft, and radiating arms secured to said disks, of a plurality of form holders carried by said arms, forms carried by said holders, means for applying coating to said forms, and means for intermittently rotating said carrying head to present said form holders successively to said coating applying means.

24. In a machine of the character described, the combination with a carrying head comprising a shaft, disks fast on said shaft and radiating arms secured to said disks, of form holders carried by said arms respectively, forms carried by said holders, means for applying coating to said forms, means for intermittently rotating said carrying head to present said form holders successively to said coating applying means, and means coöperating with said arms successively, and engaging said arms at opposite sides, for positioning said carrying head at each operation thereof.

25. In a machine of the character described, in combination, a rotating carrying head, a plurality of form holders carried by said head, forms carried by said holders, means for applying coating to said forms, a ratchet disk carried by said carrying head, a pawl coöperating with said ratchet disk, and means for periodically operating said pawl to rotate said carrying head and present said form holders successively to said coating applying means.

26. In a machine of the character described, in combination, a rotating carrying head, a plurality of form holders carried by said head, forms carried by said holders, means for applying coating to said forms, and means for intermittently rotating said carrying head to present said form holders successively to said coating applying means, said rotating means comprising a ratchet disk secured to said carrying head, an oscillating pawl carrier, a pawl on said carrier coöperating with said ratchet disk, a shaft, an arm on said shaft, a lever periodically engaged by said arm, and a link connecting said lever and pawl carrier.

27. In a machine of the character described, in combination, a rotating carrying head having a plurality of radial arms, form holders carried by said arms respectively, forms carried by said holders, means for applying coating to said forms, means for intermittently rotating said carrying head to present said form holders successively to said coating applying means, said rotating means comprising a ratchet disk secured to said head, an oscillating pawl carrier, a pawl on said carrier coöperating with said ratchet disk, a shaft, an arm on said shaft, a stud carried by said arm, a roller journaled on said stud, and a lever engaged and operated by said roller and operatively connected with said pawl carrier, a plunger coöperating with the arms of said carrying head successively for positioning said head at each operation thereof, a bell crank lever for withdrawing said plunger, and a lever operatively connected with said bell crank lever and engaged and operated by said stud.

28. In a machine of the character described, in combination, a rotating carrying head, a plurality of form holders carried by said head, forms carried by said holders, means for applying coating to said forms, means for intermittently rotating said carrying head to present said form holders successively to said coating applying means, and means to prevent said carrying head from rotating at a greater speed than that imparted thereto by said rotating means.

29. In a machine of the character described, in combination, a rotating carrying head, a plurality of form holders carried by said head, forms carried by said holders, means for applying coating to said forms, means for intermittently rotating said carrying head to present said form holders successively to said coating applying means, means to prevent said carrying head from rotating at a greater speed than that imparted thereto by said rotating means, and means for positioning said head at each operation thereof.

30. In a machine of the character described, in combination, a rotating carrying head, a plurality of form holders carried by said head, forms carried by said holders, means for applying coating to said forms, means for intermittently rotating said carrying head to present said form holders successively to said coating applying means, a ratchet wheel carried by said head, a pawl carrier rotatably mounted on said ratchet wheel, and means for rotating said pawl carrier.

31. In a machine of the character described, in combination, a rotating carrying head, a plurality of form holders carried by said head, forms carried by said holders, means for applying coating to said forms, a ratchet disk carried by said carrying head, a pawl coöperating with said ratchet disk, means for periodically operating said pawl to rotate said carrying head and present said form holders successively to said coating applying means, a ratchet wheel secured to said ratchet disk, a pawl carrier rotatably mounted on said ratchet wheel, and means for rotating said pawl carrier.

32. In a machine of the character described, in combination, a rotating carrying head, a plurality of form holders carried by said head, forms carried by said holders, means for applying coating to said forms, a shaft, means operated by said shaft for intermittently rotating said carrying head to present said form holders successively to said coating applying means, a ratchet wheel carried by said head, a pawl carrier rotatably mounted on said ratchet wheel, and means operated by said shaft for rotating said pawl carrier.

33. In a machine of the character described, in combination, a rotating carrying head, a plurality of form holders carried by said head, forms carried by said holders, means for applying coating to said forms, a shaft, means operated by said shaft for intermittently rotating said carrying head to present said form holders successively to said coating applying means, a ratchet wheel carried by said head, a pawl carrier rotatably mounted on said ratchet wheel, a sprocket wheel secured to said pawl carrier, a second sprocket wheel secured to said shaft, and a chain connecting said sprocket wheels.

34. In a machine of the character described, in combination, a rotating carrying head, a plurality of form holders carried by said head, forms carried by said holders, means for applying coating to said forms, a ratchet disk secured to said carrying head, an oscillating pawl arm, a pawl on said arm coöperating with said ratchet disk, a shaft, an arm on said shaft, a lever periodically engaged by said last-named arm and operatively connected with said pawl arm, a ratchet wheel secured to said ratchet disk, a pawl carrier rotatably mounted on said ratchet wheel, a sprocket wheel secured to said pawl carrier, a second sprocket wheel secured to said shaft, and a chain connecting said sprocket wheels.

35. In a machine of the character described, in combination, a rotating carrying head, a plurality of form holders carried by said head, forms carried by said holders, means for applying coating to said forms, means for intermittently rotating said carrying head to present said form holders successively to said coating applying means, a ratchet wheel carried by said head, a pawl carrier rotatably mounted on said ratchet wheel, pawls on said carrier, the spacing of said pawls on said carrier being disproportionate to the spacing of the teeth on said ratchet wheel, and means for rotating said pawl carrier.

36. In a machine of the character described, in combination, a board provided with spring arms for engaging and removably holding a set of forms, means for applying coating to said forms, and a carrying frame provided with means for removably holding said board.

37. In a machine of the character described, in combination, a board provided with means for removably holding a set of forms, a shaft, a carrying frame secured to said shaft and provided with means for removably holding said board, a dipping tank, means for relatively moving said carrying frame and tank to immerse said forms in the liquid in said tank, leveling means, and means on said shaft engaged by said leveling means for angularly positioning said shaft to level said board.

38. In a machine of the character described, in combination, a rotating carrying head, a plurality of sets of forms, a plurality of boards provided with means for removably holding said set of forms, a plurality of shafts journaled in said head, carrying frames secured to said shafts and provided with means for removably holding said boards, means for applying coating to said forms, and means for intermittently rotating said carrying head to present said carrying frames successively to said coating applying means.

39. In a machine of the character described, in combination, a carrying frame comprising a pair of end heads provided with grooves on their inner or adjacent faces, a board removably mounted in said grooves and provided with means for removably holding a set of forms, and means for applying coating to said forms.

40. In a machine of the character described, in combination, a shaft, a carrying frame comprising a pair of end heads secured to said shaft and provided with grooves on their inner or adjacent faces, a member removably mounted in said grooves and provided with means for removably holding a set of forms, and means for applying coating to said forms.

41. In a machine of the character described, in combination, a carrying frame comprising a pair of square end heads provided with grooves on their inner faces adjacent their edges, members removably mounted in said grooves and provided with means for removably holding sets of forms, and means for applying coating to said forms.

42. In a machine of the character described, in combination, a carrying frame comprising a pair of end heads provided with grooves on their inner or adjacent faces, a member removably mounted in said grooves and provided with means for removably holding a set of forms, clamp screws in said heads and engaging said member to hold said member seated in said grooves, and means for applying coating to said forms.

43. In a machine of the character described, in combination, a carrying head, a plurality of carrying frames carried by said head, a plurality of form holders in each of said frames, means for applying coating to the forms in said holders, means for moving said head to present said carrying frames successively to said coating applying means, and means for moving each of said carrying frames to present the form holders therein to said coating applying means successively.

44. In a machine of the character described, in combination, a carrying head, a plurality of form holders carried by said head, forms carried by said holders, means for applying a liquid coating to said forms, means for intermittently moving said carrying head to present said form holders successively to said coating applying means, and means for operating said form holders to change the position of said forms after the application of said coating and prior to the movement of said head to prevent said coating from draining from said forms and cause the same to set evenly thereon.

45. In a machine of the character described, in combination, a shaft, a form holder mounted on said shaft, forms carried by said holder, means for applying liquid coating to said forms, a pinion on said shaft, and a rack coöperating with said pinion to turn said form holder and change the position of said forms after the application of said coating.

46. In a machine of the character described, in combination, a shaft, a form holder mounted on said shaft, forms carried by said holder, means for applying liquid coating to said forms, a pinion on said shaft, a rack coöperating with said pinion, and means for moving said rack into and out of mesh with said pinion.

47. In a machine of the character described, in combination, a shaft, a form holder mounted on said shaft, forms carried by said holder, means for applying liquid coating to said forms, a pinion on said shaft, a rack coöperating with said pinion, a slide provided with ways on which said rack is guided, means for reciprocating said rack on said ways to rotate said pinion, ways arranged transverse to said first named ways and upon which said slide is guided, and means for moving said slide on said last named ways to move said rack into and out of mesh with said pinion.

48. In a machine of the character described, in combination, a shaft, a form holder mounted on said shaft, forms carried by said holder, means for applying liquid coating to said forms, a pinion on said shaft, a rack coöperating with said pinion, a slide provided with ways on which said rack is guided, a rock shaft, an arm on said rock shaft operatively connected with said rack, a second arm on said rock shaft, a cam coöperating with said last named arm, ways arranged transverse to said first named ways and upon which said slide is guided, an operating rod for said slide, and a cam coöperating with said rod.

49. In a machine of the character described, in combination, a shaft, a form holder mounted on said shaft, forms carried by said holder, means for applying liquid coating to said forms, a pinion on said shaft, a bracket provided with projecting pins, a rack coöperating with said pinion and provided with slots which receive said pins whereby said rack is guided on said bracket, and means for reciprocating said rack.

50. In a machine of the character described, in combination, a shaft, a form holder mounted on said shaft, forms carried by said holder, means for applying liquid coating to said forms, a pinion on said shaft, a bracket provided with projecting pins, a rack coöperating with said pinion and provided with slots which receive said pins whereby said rack is guided on said bracket, one of said slots having a cam portion for moving said rack into and out of engagement with said pinion, and means for reciprocating said rack.

51. In a machine of the character described, in combination, a shaft, a form holder mounted on said shaft, forms carried by said holder, means for applying liquid coating to said forms, a pinion on said shaft, a bracket provided with projecting pins, a rack coöperating with said pinion and provided with slots which receive said pins whereby said rack is guided on said bracket, a cam, a rock shaft, an arm on said rock shaft coöperating with said cam, and a second arm on said rock shaft connected with said rack.

52. In a machine of the character described, in combination, a carrying head, a plurality of shafts journaled in said head, form holders mounted on said shafts, forms carried by said holders, means for applying liquid coating to said forms, means for intermittently moving said carrying head to bring said form holders successively into operative relationship to said coating applying means, pinions on said shafts, and a plurality of racks adapted respectively to engage and turn said pinions in different positions of said carrying head.

53. In a machine of the character described, in combination, a carrying head, a plurality of shafts journaled in said head, form holders mounted on said shafts, forms carried by said holders, means for applying liquid coating to said forms, means for intermittently moving said carrying head to bring said form holders successively into operative relationship to said coating applying means, pinions on said shafts, a pair of racks adapted respectively to engage and turn said pinions in different positions of said carrying head, a rock shaft, an arm on said rock shaft operatively connected with one of said racks, a second arm on said rock shaft, a cam for operating said last named arm, a sleeve on said rock shaft, an arm on said sleeve operatively connected with the other of said racks, a second arm on said sleeve, and a cam for operating said last named arm.

54. In a machine of the character described, in combination, a carrying head, a plurality of shafts journaled in said head, form holders mounted on said shafts, forms carried by said holders, means for applying liquid coating to said forms, means for intermittently moving said carrying head to bring said form holders successively into operative relationship to said coating applying means, pinions on said shafts, a pair of racks adapted respectively to engage and turn said pinions in different positions of said carrying head, a bracket provided with projecting pins, one of said racks being provided with slots which receive said pins whereby said rack is guided on said bracket, a slide provided with ways on which the other of said racks is guided, a rock shaft, an arm on said rock shaft operatively connected with said first named rack, a second arm on said rock shaft, a cam for operating said last named arm, a sleeve on said rock shaft, an arm on said sleeve operatively connected with the other of said racks, a second arm on said sleeve, a cam for operating said last named arm, ways arranged transverse to said first named ways and upon which said slide is guided, an operating rod for said slide, and a cam coöperating with said rod.

55. In a machine of the character described, in combination, a carrying head, a plurality of carrying frames in said head, a plurality of form holders in each of said carrying frames, means for applying a liquid coating to the forms in said holders, means for intermittently moving said carrying head to bring said carrying frames successively into operative relationship to said coating means, and means for turning said carrying frames in said head to present the several form holders in the several frames successively to said coating means.

56. In a machine of the character described, in combination, a carrying head, a plurality of shafts journaled in said head, form holders carried by said shafts, dipping forms carried by said form holders, a dipping tank, means for relatively moving said carrying head and tank to immerse said forms in the liquid in said tank, means for intermittently moving said carrying head to present the forms in the several holders successively to said dipping tank, operating and controlling means on said shafts, leveling means coöperating with said operating and controlling means to level said form holders prior to the immersion of said forms, and stationary means also coöperating with said operating and controlling means to turn said shafts in said head as said head is moved.

57. In a machine of the character described, in combination, a carrying head, a plurality of shafts journaled in said head, form holders carried by said shafts, sets of dipping forms carried by said form holders, a dipping tank, means for relatively moving said carrying head and tank to immerse said forms in the liquid in said tank, means for intermittently moving said carrying head to bring said form holders successively into operative position with respect to said tank, star wheels on said shafts, means coöperating with the star wheel on a shaft in operative position for leveling the corresponding form holder prior to the immersion of the forms thereon, and a series of stationary studs engaged by said star wheels as said head is moved to turn said shafts in said head.

58. In a machine of the character described, in combination, a carrying head, a plurality of shafts journaled in said head, carrying frames mounted on said shafts, a plurality of form holders in each of said carrying frames, means for applying liquid coating to the forms in said holders, means for intermittently moving said carrying head to bring said carrying frames successively into operative position with respect to said coating applying means, star wheels on said shafts, and a series of stationary studs engaged by said star wheels as said head is moved to turn said shafts in said head, said studs being arranged to produce a complete reversal of said carrying frames during certain movements of said head and to turn said carrying frames into positions to present different form holders to said coating applying means at the completion of successive cycles of movement of said carrying head.

59. In a machine of the character described, in combination, a carrying head, a plurality of shafts journaled in said head, form holders carried by said shafts, means for applying liquid coating to the forms in said holders, means for intermittently moving said carrying head to present the forms in the several holders successively to said coating applying means, star wheels on said shafts, a series of studs engaged by said star wheels as said head is moved to turn said shafts in said head, means for moving one of said studs out of engagement with the corresponding star wheel when said head is stationary, and means for rotating the corresponding shaft when said star wheel is disengaged by said stud.

60. In a machine of the character described, in combination, a carrying head, a plurality of shafts journaled in said head, form holders carried by said shafts, forms carried by said holders, means for applying liquid coating to said forms, means for intermittently moving said carrying head to present the forms in the several holders successively to said coating applying means, pinions on said shafts, star wheels on said shafts, a series of studs engaged by said star wheels as said head is moved to turn said shafts in said head, means for moving one of said studs out of engagement with the corresponding star wheel when said head is stationary, and a rack coöperating with the pinion on the corresponding shaft to rotate said shaft when said star wheel is disengaged by said stud.

61. In a machine of the character described, in combination, a carrying head, a plurality of shafts journaled in said head, form holders carried by said shafts, a set of dipping forms carried by each of said holders, a dipping tank, means for relatively moving said carrying head and tank to immerse the forms of one of said sets in the liquid in said tank, means for intermittently moving said carrying head to bring said form holders successively into operative position with respect to said tank, means for leveling the form holder in operative position, star wheels on said shafts with which said leveling means coöperates, a series of studs engaged by said star wheels as said head is moved, means for moving one of said studs out of engagement with the corresponding star wheel and for simultaneously operating said leveling means, and means for rotating the shaft whose star wheel is disengaged by said stud.

62. In a machine of the character described, in combination, a carrying head, a plurality of shafts journaled in said head, form holders carried by said shafts, means for applying liquid coating to the forms in said holders, means for intermittently moving said carrying head to present the forms in the several holders successively to said coating applying means, star wheels on said shafts, a series of studs engaged by said star wheels as said head is moved to turn said shafts in said head, a lever by which one of said studs is carried, a link for operating said lever, a rock shaft having an arm to which said link is connected, a second arm on said rock shaft, and a cam coöperating with said last named arm.

63. In a machine of the character described, in combination, a carrying head, a plurality of shafts journaled in said head, form holders carried by said shafts, a set of dipping forms carried by each of said holders, a dipping tank, means for relatively moving said carrying head and tank to immerse the forms of one of said sets in the liquid in said tank, means for intermittently moving said carrying head to bring said form holders successively into operative position with respect to said tank, star wheels on said shafts, a series of studs engaged by said star wheels as said head is moved to turn said shafts in said head, a lever by which one of said studs is carried, a link for operating said lever, a rock shaft having an arm to which said link is connected, a second rock shaft, a pair of arms on said last-named shaft adapted to engage the star wheel of a form holder shaft when in operative position to level the corresponding form holder, a third arm on said last-named rock shaft, a link connecting said last-named arm with the arm on said first-named rock shaft, a second arm on said first-named rock shaft, and a cam coöperating with said second arm.

64. In a machine of the character described, in combination, a carrying head, a plurality of form holders in said head, means for applying liquid coating to the forms in said holders, means for intermittently moving said carrying head to present the forms in the several holders successively to said coating means, means for rapidly and frequently turning the several holders in said head after the coating operation, and means for thereafter turning said holders in said head with less frequency.

65. In a machine of the character described, in combination, a carrying head, a plurality of shafts journaled in said head, carrying frames mounted on said shafts, a plurality of form holders in each of said carrying frames, means for applying liquid coating to the forms in said holders, means for intermittently moving said carrying head to bring said frames successively into operative relationship to said coating means, means for rapidly and frequently turning the several shafts in said head immediately after the coating operation, and stationary means coöperating with said shafts for thereafter turning the same in said head with less frequency as said head is moved, said last named means being constructed and arranged to cause said carrying frames to present the several form holders in the several frames successively to said coating means.

66. In a machine of the character described, in combination, a carrying head, a plurality of form holders in said head, means for applying liquid coating to the forms in said holders, means for intermittently moving said carrying head to present the forms in the several holders successively to said coating means, means operable to turn the holders in said head after the coating operation while said head is stationary, and stationary means coöperating with said holders to turn the same in said head as said head is moved.

67. In a machine of the character described, in combination, a rotating carrying head, a plurality of shafts journaled in said head, carrying frames mounted on said shafts, a plurality of form holders in each of said carrying frames, a set of forms in each of said holders, means for applying liquid coating to said forms, means for intermittently rotating said carrying head to present the several carrying frames successively to said coating applying means, star wheels on said shafts, a stationary ring arranged adjacent the end of said carrying head, a series of studs arranged about said ring and engaged by said star wheels as said head is rotated to turn said shafts in said head, said studs being arranged to produce a complete reversal of said carrying frames during certain movements of said head and to turn said carrying frames to positions to present different form holders to said coating applying means at the completion of successive cycles of movement of said carrying head, means for moving one of said studs out of engagement with the corresponding star wheel when said head is stationary, and means for rotating the corresponding shaft when said star wheel is disengaged by said stud.

68. In a machine of the character described, in combination, a carrying head, a plurality of sets of form carriers in said head, dipping forms in said form carriers, a plurality of dipping tanks coöperating with the respective form carriers of the several sets, means for relatively moving said carrying head and tanks to immerse said forms in the liquid in said tanks, and means for intermittently moving said carrying head to bring corresponding form carriers of the several sets into operative position with respect to said tanks.

69. In a machine of the character described, in combination, a carrying head, a plurality of sets of form carriers in said head, a plurality of sets of dipping forms in each of said form carriers, a plurality of dipping tanks coöperating with the respective form carriers of the several sets, means for relatively moving said carrying head and tanks to immerse said forms in the liquid in said tanks, means for intermittently moving said carrying head to bring corresponding form carriers of the several sets into operative position with respect to said tanks, and means for turning the corresponding form carriers in the several sets to bring different sets of dipping forms into operative position with respect to said tanks.

70. In a machine of the character described, in combination, a rotating carrying head, shafts journaled in said head, a plurality of carrying frames on each of said shafts, a plurality of form carriers in each of said frames, a plurality of dipping tanks, means for raising and lowering said tanks, means for intermittently rotating said head and means for rotating said shafts in said head.

In testimony whereof I affix my signature in presence of two witnesses.

JEREMIAH L. MAHONEY.

Witnesses:
 ELIZABETH CARTER,
 ELIZABETH S. RATHGEBER.